United States Patent
Scothern

(10) Patent No.: US 10,233,769 B2
(45) Date of Patent: Mar. 19, 2019

(54) STATOR VANE ASSEMBLY

(71) Applicant: ROLLS-ROYCE PLC, London (GB)

(72) Inventor: David Peter Scothern, Derby (GB)

(73) Assignee: ROLLS-ROYCE plc, London (GB)

( * ) Notice: Subject to any disclaimer, the term of this patent is extended or adjusted under 35 U.S.C. 154(b) by 716 days.

(21) Appl. No.: 14/746,052

(22) Filed: Jun. 22, 2015

(65) Prior Publication Data

US 2016/0017744 A1    Jan. 21, 2016

(30) Foreign Application Priority Data

Jul. 18, 2014 (GB) .................................. 1412813.6

(51) Int. Cl.
*F01D 17/12* (2006.01)
*F01D 17/24* (2006.01)
(Continued)

(52) U.S. Cl.
CPC .............. *F01D 17/12* (2013.01); *F01D 9/02* (2013.01); *F01D 9/041* (2013.01); *F01D 17/00* (2013.01);
(Continued)

(58) Field of Classification Search
CPC . F01D 9/02; F01D 9/041; F01D 9/042; F01D 17/00; F01D 17/12; F01D 17/16;
(Continued)

(56) References Cited

U.S. PATENT DOCUMENTS 2,603,300 A * 7/1952 King ....................... F03D 3/068
                                                    416/10
4,695,220 A * 9/1987 Dawson ................ F04D 29/563
                                                    415/156
(Continued)

FOREIGN PATENT DOCUMENTS

SU         779594 A1    11/1980
WO     2010/007224 A1    1/2010

OTHER PUBLICATIONS

Nov. 26, 2015 Extended Search Report issued in European Patent Application No. 15172956.3.
(Continued)

*Primary Examiner* — Justin Seabe
*Assistant Examiner* — Alexander White
(74) *Attorney, Agent, or Firm* — Oliff PLC

(57) ABSTRACT

Stator vane assembly includes plurality of vanes arranged in circumferential array, radially proximal mounting portion, radially distal mounting portion, and first latching mechanism. Each of plurality of vanes extends radially between radially proximal mounting portion and radially distal mounting portion, with each of plurality of vanes being pivotally mounted between radially proximal mounting portion and radially distal mounting portion. Plurality of vanes is movable between first arrangement allowing gas to flow across vanes, and second arrangement blocking gas flow across vanes. Pivot axis of each of plurality of vanes is offset from the line of aerodynamic center of pressure of vane towards trailing edge of vane, and first latching mechanism
(Continued)

holds plurality of vanes in first arrangement. Upon receipt of signal, first latching mechanism releases plurality of vanes so that gas flow through vane assembly causes plurality of vanes to move from first arrangement to second arrangement.

10 Claims, 4 Drawing Sheets

(51) Int. Cl.
*F01D 9/04* (2006.01)
*F01D 9/02* (2006.01)
*F01D 17/00* (2006.01)
*F01D 17/16* (2006.01)
*F01D 19/00* (2006.01)
*F01D 21/02* (2006.01)
*F02C 9/28* (2006.01)

(52) U.S. Cl.
CPC ............ *F01D 17/16* (2013.01); *F01D 17/162* (2013.01); *F01D 17/24* (2013.01); *F01D 19/00* (2013.01); *F01D 21/02* (2013.01); *F02C 9/28* (2013.01); *F05D 2220/32* (2013.01); *F05D 2240/12* (2013.01); *Y02T 50/671* (2013.01)

(58) Field of Classification Search
CPC ........ F01D 17/162; F01D 17/24; F01D 19/00; F01D 21/02; F01D 21/14; F05D 2220/32; F05D 2240/12; F05D 2250/90
See application file for complete search history.

(56) References Cited

U.S. PATENT DOCUMENTS

| 7,922,445 | B1 | 4/2011 | Pankey et al. | |
| 2008/0145206 | A1* | 6/2008 | Lighty | ................. F01D 17/162 |
| | | | | 415/159 |
| 2010/0104423 | A1* | 4/2010 | Severin | .................... F01D 9/02 |
| | | | | 415/159 |

OTHER PUBLICATIONS

Jan. 15, 2015 Search Report issued in British Patent Application No. 1412813.6.

\* cited by examiner

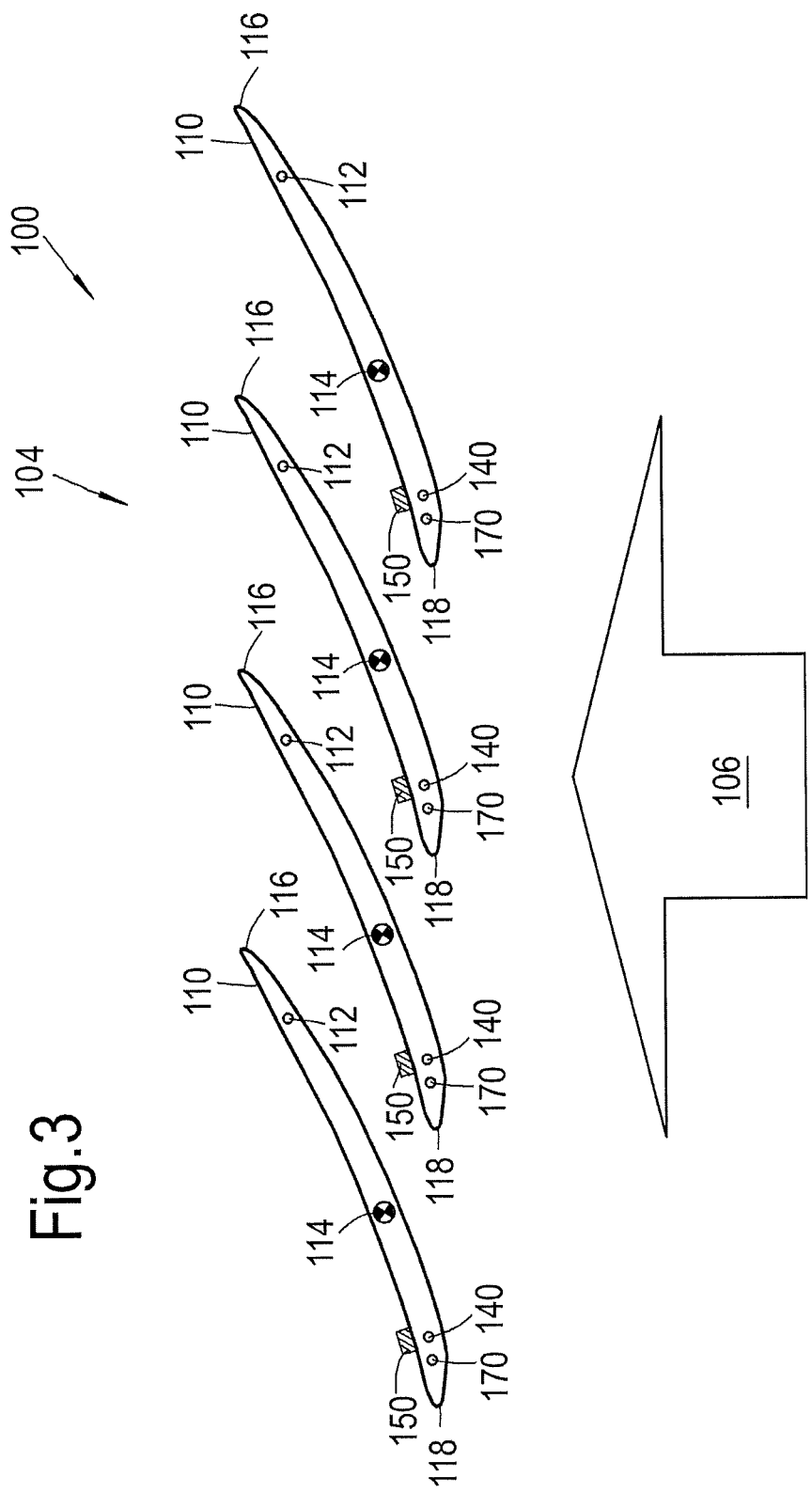

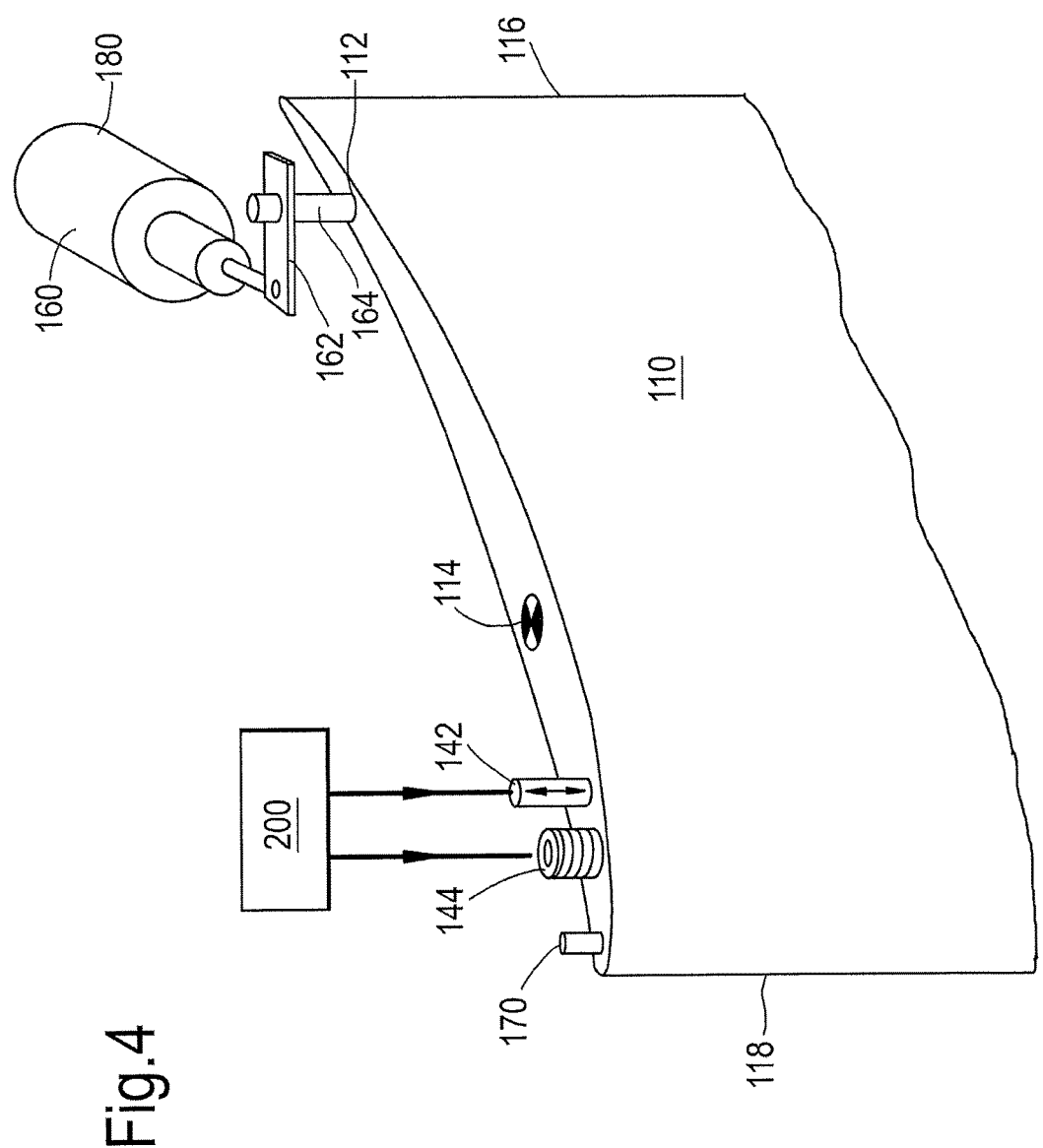

STATOR VANE ASSEMBLY

This disclosure claims the benefit of UK Patent Application No. GB 1412813.6, filed on 18 Jul. 2014, which is hereby incorporated herein in its entirety.

FIELD OF THE INVENTION

The present invention relates to a vane assembly and particularly, but not exclusively, to a stator vane assembly for a gas turbine engine.

BACKGROUND TO THE INVENTION

A gas turbine engine is a type of internal combustion engine having an upstream rotating compressor coupled to a downstream turbine, with a combustion chamber positioned between the compressor and the turbine.

Incoming air flows through the compressor that brings it to higher pressure. Energy is then added by spraying fuel into the compressed air and igniting it, with the resulting combustion generating a high temperature, high pressure gas flow. This gas flows enters the turbine, where it expands down to the exhaust pressure, while producing a shaft work output in the process. The turbine shaft work is used to drive the compressor and any ancillary devices that may be coupled to the shaft. The remaining energy in the exhaust gases is exhausted from the engine and provides thrust.

Each of the compressor and turbine comprises one or more rotors, with each rotor being paired with a corresponding stator vane array.

In the event of an engine failure that results in a loss of torque carrying capability in one of the rotors, the turbine will experience a transient overspeed event. This will result in a significantly increased mechanical loading of the turbine disc and may cause the turbine disc to burst.

Conventional design protocols require the turbine disc to be sized to withstand such a transient overspeed event. This increases the weight of the turbine disc.

Current aerospace regulatory frameworks stipulate that turbine disc failure events must occur at a rate less than $1 \times 10^{-8}$ events per engine flying hour. Current design protocols result in turbine disc designs in which any failure cannot result in the assembly reaching a sufficiently high overspeed as to burst the disc. Such turbine disc designs result in increased turbine disc weight in order to increase its margin of safety.

It is desirable therefore to provide a means of limiting the turbine disc speed reached during an overspeed event, in order to be able to reduce turbine disc weight and so improve its reliability.

STATEMENTS OF INVENTION

According to a first aspect of the present invention there is provided a stator vane assembly comprising:
a plurality of vanes arranged in a circumferential array;
a radially proximal mounting portion;
a radially distal mounting portion; and
a first latching mechanism;
each of the plurality of vanes extending radially between the radially proximal mounting portion and the radially distal mounting portion;
each of the plurality of vanes being pivotally mounted between the radially proximal mounting portion and the radially distal mounting portion;
the plurality of vanes being movable between a first arrangement allowing gas to flow across the vanes, and a second arrangement blocking gas flow across the vanes;
wherein a pivot axis of each of the plurality of vanes is offset from the line of aerodynamic centre of pressure of the vane towards a trailing edge of the vane; and
the first latching mechanism holds the plurality of vanes in the first arrangement and, upon receipt of a signal, releases the plurality of vanes so that the gas flow through the vane assembly causes the plurality of vanes to move from the first arrangement to the second arrangement.

An advantage of the stator vane assembly of the present invention is that no actuator mechanism is required to rotate the vanes when the first latching mechanism is actuated. The momentum of the gas flow passing through the assembly provides an actuating torque on each of the plurality of vanes to move them from the first arrangement to the second arrangement. This makes the assembly of the present invention simple and weight efficient, thus making it attractive to an engine designer.

While actuatable stator vanes are known (often termed 'variable stator vanes' or VSVs) these are actuated by large and slow actuators which are designed to make frequent small angular adjustments to the vane position as part of the engine control system.

In addition, VSVs are constrained by the requirement to rotate in both clockwise and anti-clockwise directions. In contrast, the stator vane assembly of the invention is sized to provide rapid closure since there is no requirement for it to have to open under gas loading.

Furthermore, due to the high gas flow rates through a gas turbine engine, the actuation time is sufficiently small as to enable the stator vane assembly of the invention to quickly respond to turbine disc overspeed events. In doing so the stator vane assembly of the invention will aid in mitigating the severity of any turbine disc overspeed, and hence will allow the turbine disc weight to be reduced.

In one embodiment of the invention, the plurality of vanes is arranged in a circumferential array, the circumferential array forming a complete circular array around an axis of the stator vane assembly.

In another arrangement of the invention, the circumferential array forms only a partial circular array around the stator vane assembly axis. This arrangement provides for a lower weight and lower cost installation than a complete circular array arrangement. In this arrangement, by restricting an air flow through the stator vane assembly over a limited arc area will generate a non-axisymmetric flow therethrough. This will, in turn, disrupt the air flow through the turbine and ameliorate any turbine overspeed.

Optionally, the stator vane assembly further comprises a limit stop, the limit stop defining an angular position of each of the vanes when the vanes are positioned in the second arrangement.

The limit stop can be positioned so as to control the orientation of the vanes when in the second arrangement and thereby to throttle the gas flow passing through the vane assembly. This throttled gas flow may be selected so as to promote the onset of surge within the engine and so prevent overspeed of the turbine disc.

Optionally, the stator vane assembly further comprises a damper assembly that controls the rate of angular rotation of each vane during the vane's transition from the first arrangement to the second arrangement.

The use of a damper assembly means that the vanes do not bounce off the limit stop as they move to the second arrangement. By moving monotonically from the first arrangement to the second arrangement, the assembly of the invention ensures that the gas flow through the engine is throttled.

Optionally, the stator vane assembly further comprises a second latching mechanism, and wherein after the plurality of vanes have moved to the second arrangement, the second latching mechanism retains the vanes in the second arrangement.

The second latching mechanism secures the vanes in the second arrangement and prevents their reopening, for example as a consequence of surge air flows. This provides a user of the invention with certainty that the air flow through the stator vane assembly is throttled after actuation.

Optionally, the stator vane assembly further comprises an actuator, and wherein after the plurality of vanes have moved to the second arrangement, the actuator moves the vanes from the second arrangement to the first arrangement.

The actuator enables the stator vane assembly to be 'reset' after the first latching mechanism has been actuated to throttle flow through the assembly. This enables a user to restart the engine after, for example, a spurious deployment of the stator vane assembly.

Optionally, the first latching mechanism comprises a plurality of actuatable locking pins, each of the plurality of locking pins corresponding to a respective one of the vanes.

In one arrangement of the invention the first latching mechanism comprises a plurality of actuatable locking pins, with each pin being positioned at the radially distal end of one of the plurality of vanes. The locking pins may be moved from a latched position in which they retain the vanes in the first arrangement to an unlatched position in which the vanes are free to rotate, by any suitable linear actuator such as, for example, an electromagnetic solenoid or a hydraulic linear actuator.

Optionally, the first latching mechanism comprises an electromagnet configured to hold the plurality of vanes in the first arrangement when the electromagnet is energised.

In one arrangement of the invention the first latching mechanism comprises an electromagnet that holds each vane in the first arrangement. Release of the electromagnetic actuator allows each of the vanes to rotate under the action of the gas flow though the vane assembly.

Optionally stator vane assembly further comprises a unison ring, each of the plurality of vanes being engageably coupled to the unison ring, wherein the first latching mechanism comprises an electromagnet configured to position the unison ring such that the plurality of vanes are in the first arrangement when the electromagnet is energised.

The use of a unison ring to collectively couple each of the plurality of vanes ensures that the vanes move together in a co-ordinated manner.

According to a second aspect of the present invention there is provided a method of controlling an airflow through a stator vane assembly, the stator vane assembly comprising a plurality of circumferentially arranged vanes, the method comprising the steps of:

(i) arranging a gas flow through the stator vane assembly;
(ii) positioning the plurality of vanes in a first arrangement and secured therein by a first latching mechanism, allowing a gas flow through the stator vane assembly; and
(ii) releasing the first latching mechanism to enable the gas flow impinging on the vanes to move the vanes from the first arrangement to a second arrangement in which gas flow through the stator vane assembly is blocked.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which:

FIG. 3 shows the sectional view of FIG. 2, with the vanes in a second arrangement; and FIG. 4 shows a perspective view of a distal end of a vane from the stator vane assembly of FIG. 1.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
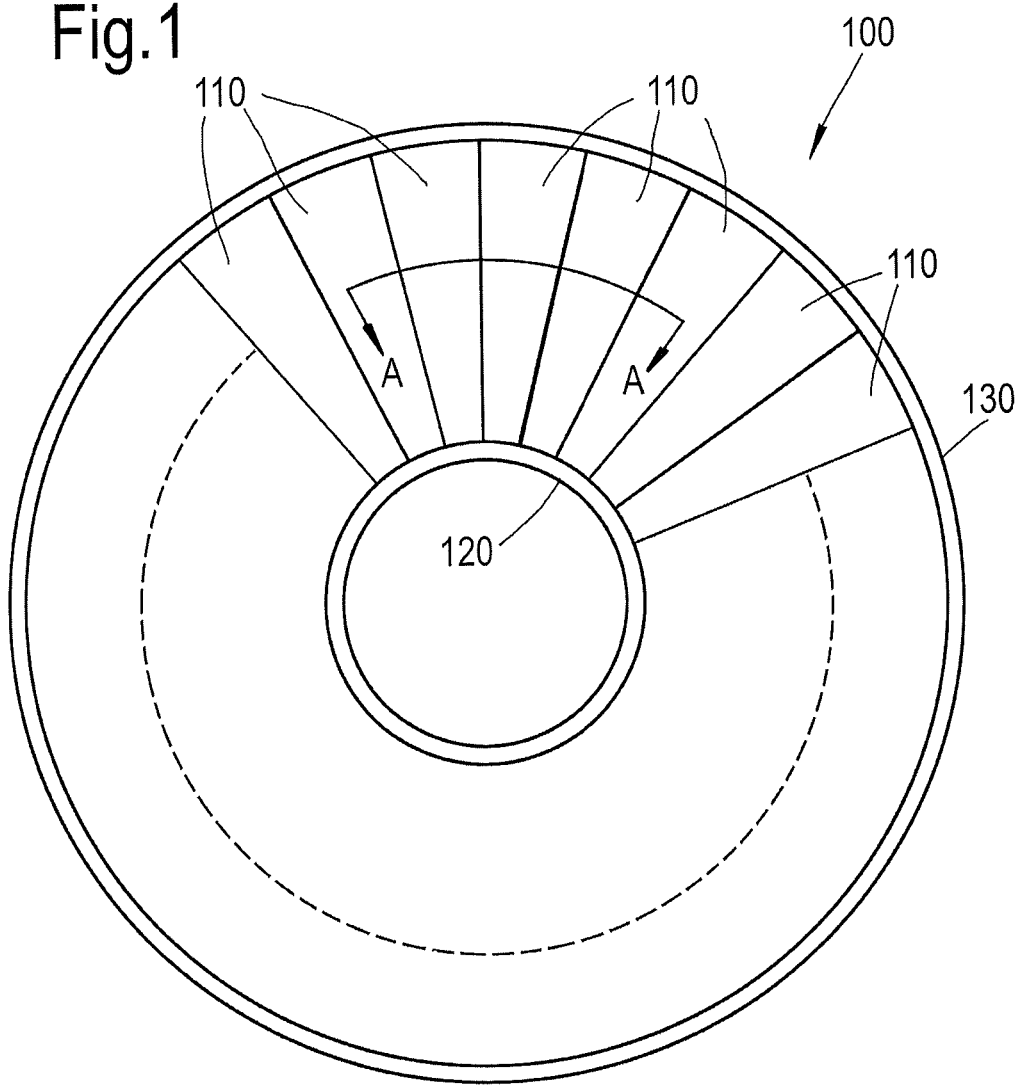
FIG. 1 shows an elevational view of a stator vane assembly according to an embodiment of the present invention.
Figure 2:
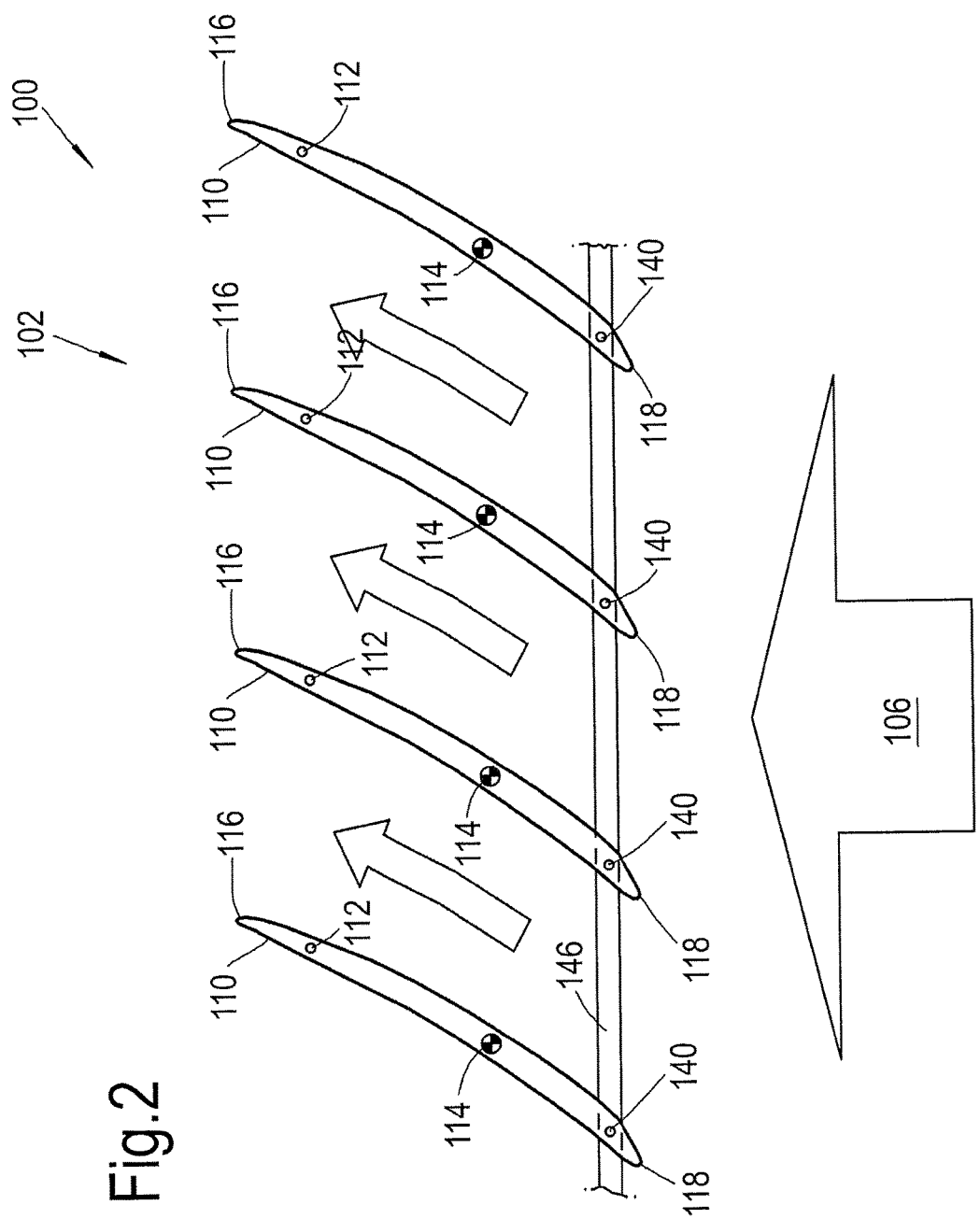
FIG. 2 shows a sectional view on A-A of the vanes of the stator vane assembly of FIG. 1, with the vanes in a first arrangement.

Referring to FIGS. 1 to 3, a stator vane assembly according to an embodiment of the invention is designated generally by the reference numeral 100. The stator vane assembly 100 forms part of a gas turbine engine (not shown) which in turn forms part of a high bypass ratio turbofan engine (not shown).

The stator vane assembly 100 comprises a plurality of vanes 110 that are arranged in a circumferential array, a radially proximal mounting portion 120, a radially distal mounting portion 130 and a first latching mechanism 140.

In the present embodiment, the radially proximal mounting portion 120 forms part of the engine core shaft housing. In other arrangements, the radially proximal mounting portion 120 may be formed as a separate component, for example as an annular component.

Similarly, in the present embodiment, the radially distal mounting portion 130 is formed as part of the turbine assembly casing. In other embodiments the radially distal mounting portion 130 may be formed separately, for example as an annular component.

Each of the vanes 110 extends radially between the radially proximal mounting portion 120 and the radially distal mounting portion 130.

Each of the vanes 110 is pivotally mounted between the radially proximal mounting portion 120 and the radially distal mounting portion 130. The pivot axis 112 of each vane 110 extends radially outwardly from the proximal mounting portion 120.

In an alternative arrangement, the radially innermost end of the pivot axis 112 may be circumferentially offset from the radially outermost end of the pivot axis 112.

The first latching mechanism 140 secures the vanes in a first arrangement 102 as shown in FIG. 2. In the first arrangement, air flows through the stator vane assembly 100 as for normal operation of the gas turbine engine.

Upon receipt of a signal from the engine operator, the first latching mechanism 140 releases each of the vanes 110. The momentum of the gas flow 106 passing through the stator vane assembly 100 causes each of the vanes to rotate in the direction of the gas flow 106 to a second arrangement 104. In the second arrangement 104 the vanes 110 block the gas flow 106 through the stator vane assembly 100.

In the present embodiment the second arrangement 104 allows a residual gas flow to pass through the stator vane assembly 100. In another arrangement, the second arrangement 104 may completely block the flow of gas 106 through the stator vane assembly 100.

The stator vane assembly 100 further comprises a limit stop 150. The limit stop 150 prevents the rotational movement of each of the vanes 110 past the point at which the vanes 110 form the second arrangement 104.

The limit stop 150 is formed as a plurality of protrusions on the radially distal mounting portion 130. When the vanes 110 are positioned in the second arrangement 104 the limit stop 150 contacts the vane 110 to thereby prevent further movement of the vane 110. In another arrangement, the limit stop 150 may be integrated around the pivot axis 112 of the vane 110.

The vanes 110 are formed from the same materials and using the same manufacturing processes as conventional variable stator vanes for a gas turbine engine.

In the vanes 110 of the present invention, the pivot axis 112 is offset from the line of aerodynamic centre of pressure 114 of the vane 110 in the direction of the trailing edge 116 of the vane 110. This offset results in the gas flow 106 through the stator vane assembly 100 producing a torque on each of the vanes.

The first latching mechanism 140 in the form of an actuatable locking pin 142 is positioned towards a leading edge 118 of the vane 110.

One example of the configuration of the vane 110 is shown in FIG. 4. As shown in FIGS. 2 and 3, the vane 110 is pivotally mounted around pivot axis 112. The first latching mechanism 140 is formed as an actuatable pin 142 that extends radially in and out of engagement of the vane 110.

In this example configuration the first latching mechanism 140 further comprises an electromagnet 144 positioned at a leading edge of the vane 110. The electromagnet 144 retains the vane 110 in the first arrangement 102 when the electromagnet 144 is energised. When the electromagnet 144 is de-energised, the vane is capable of rotating under the action of the gas flow 106, subject to the release of the actuatable pin 142.

The actuatable pin 142 and electromagnet 144 may each serve to latch the vane in the first arrangement 102 and so each may be used in place of the other. Alternatively, as in the present embodiment, the first latching mechanism 140 may comprise both an actuatable pin 142 and an electromagnet 144.

In the present embodiment, the electromagnet 144 is configured to 'arm' the first latching mechanism 140 with the actuatable pin 142 acting to release the vane 110 when required to move the vane assembly 100 to the second arrangement 104.

The stator vane assembly 100 further comprises a damper assembly 160 that serves to damp the rotational movement of the vanes 110 from the first arrangement 102 to the second arrangement 104. In the present embodiment, the damper assembly 160 is a hydraulic damper that is connected to the vane by a connecting link 162 and pivot 164. The pivot 164 is arranged coincident with the vane pivot axis 112.

Once the vanes 110 have moved from the first arrangement 102 to the second arrangement 104 they are retained in this position by the second latching mechanism 170. As shown in FIG. 3, in the present embodiment the second latching mechanism 170 is formed as a further actuatable pin that is secured at the leading edge 118 of the vane 110. In other arrangements the second latching mechanism 170 may comprise an electromagnet.

Once the stator vane assembly 100 has been operated with the vanes 110 moving from the first arrangement 102 to the second arrangement 104 there will be a need to 'reset' the vanes into the first arrangement 102 in order to be able to restart the engine. This requires the use of an actuator 180 to rotate the vanes 110 to the first arrangement 102.

In the present embodiment the function of the actuator 180 is combined with the function of the damper assembly 160. This combined damper/actuator assembly is hydraulically operated.

In use, when the engine control unit detects operational parameters or engine characteristics that indicate that a turbine disc overspeed event is likely to occur, a signal 200 is sent to the first latching mechanism 140. This signal 200 de-energises the electromagnet 144 in readiness for release of the vanes 110.

When a turbine disc overspeed event is detected by the engine control system, the actuatable pins 142 are released which enables the gas flow 106 through the stator vane assembly 100 to slam the vanes 110 from the first arrangement 102 to the second arrangement 104.

This sudden restriction to the gas flow through the engine causes a surge event downstream of the stator vane assembly 100 which in turn causes a sudden drop in turbine disc rotational speed.

In the event of the operation of the stator vane assembly 100 being spurious or where the engine is deemed to be capable of safe operation, the actuator 180 can be operated to 'reset' the vanes into the first arrangement prior to initiation of the engine restart sequence.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A stator vane assembly comprising:
   a plurality of vanes arranged in a circumferential array;
   a radially proximal mounting portion;
   a radially distal mounting portion; and
   a controllable first latch;
   each of the plurality of vanes extending radially between the radially proximal mounting portion and the radially distal mounting portion;
   each of the plurality of vanes being pivotally mounted between the radially proximal mounting portion and the radially distal mounting portion;
   the plurality of vanes being movable between a first arrangement allowing gas to flow across the plurality of vanes, and a second arrangement blocking gas flow across the plurality of vanes;
   wherein a pivot axis of each of the plurality of vanes is offset from a line of aerodynamic centre of pressure of each of the plurality of vanes towards a trailing edge of each of the plurality of vanes; and the controllable first latch holds the plurality of vanes in the first arrangement and, upon receipt of a control signal, releases the plurality of vanes so that the gas flow through the stator vane assembly causes the plurality of vanes to move from the first arrangement to the second arrangement.

2. The stator vane assembly as claimed in claim 1, further comprising a limit stop, the limit stop defining an angular position of each of the plurality of vanes when the plurality of vanes are positioned in the second arrangement.

3. The stator vane assembly as claimed in claim 1, further comprising a damper that controls a rate of angular rotation of each of the plurality of vanes during the vane's transition from the first arrangement to the second arrangement.

4. The stator vane assembly as claimed in claim 1, further comprising a second latch, and wherein after the plurality of vanes have moved to the second arrangement, the second latch retains the plurality of vanes in the second arrangement.

5. The stator vane assembly as claimed in claim 1, further comprising an actuator, and wherein after the plurality of vanes have moved to the second arrangement, the actuator moves the plurality of vanes from the second arrangement to the first arrangement.

6. The stator vane assembly as claimed in claim 1, wherein the first latch comprises a plurality of actuatable locking pins, each of the plurality of actuatable locking pins corresponding to a respective one of the plurality of vanes.

7. The stator vane assembly as claimed in claim 1, wherein the first latch comprises an electromagnet configured to hold the plurality of vanes in the first arrangement when the electromagnet is energised.

8. The stator vane assembly as claimed in claim 1, further comprising a unison ring, each of the plurality of vanes being engageably coupled to the unison ring, wherein the first latch comprises an electromagnet configured to position the unison ring such that the plurality of vanes are in the first arrangement when the electromagnet is energised.

9. The stator vane assembly as claimed in claim 1, wherein the aerodynamic centre of pressure of each of the plurality of vanes is between a leading edge of each of the plurality of vanes and the trailing edge of each of the plurality of vanes in a leading edge-to-trailing edge cross-section of each of the plurality of vanes, and the pivot axis of each of the plurality of vanes is offset from the aerodynamic centre of pressure of each of the plurality of vanes towards the trailing edge.

10. A method of controlling an airflow through a stator vane assembly, the stator vane assembly comprising a plurality of circumferentially arranged vanes, the method comprising the steps of:
  (i) arranging a gas flow through the stator vane assembly;
  (ii) positioning the plurality of vanes in a first arrangement and secured therein by a first latch, allowing a gas flow through the stator vane assembly; and
  (iii) controllably releasing the first latch to enable the gas flow impinging on the vanes to move the plurality of vanes from the first arrangement to a second arrangement in which gas flow through the stator vane assembly is blocked.

* * * * *